P. WERTZ.
ENGINEER'S BRAKE VALVE.
APPLICATION FILED FEB. 18, 1914.

1,160,800.

Patented Nov. 16, 1915.
2 SHEETS—SHEET 1.

P. WERTZ.
ENGINEER'S BRAKE VALVE.
APPLICATION FILED FEB. 18, 1914.
1,160,800.
Patented Nov. 16, 1915.
2 SHEETS—SHEET 2.
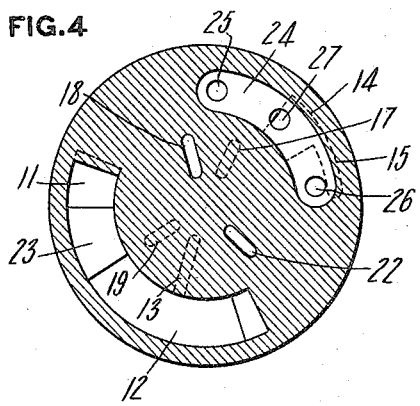
FIG. 4
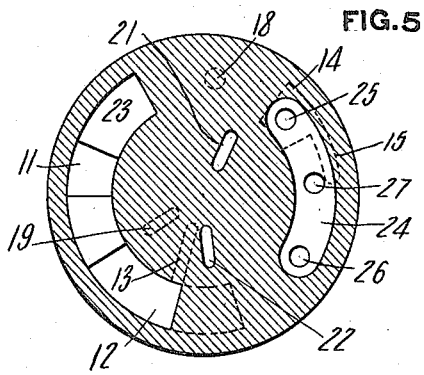
FIG. 5
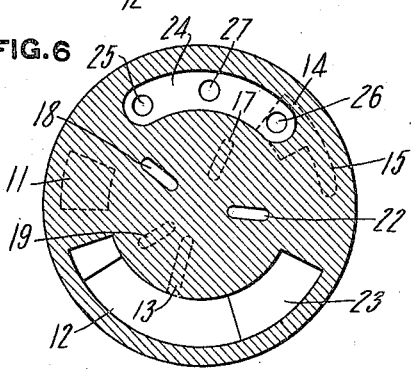
FIG. 6
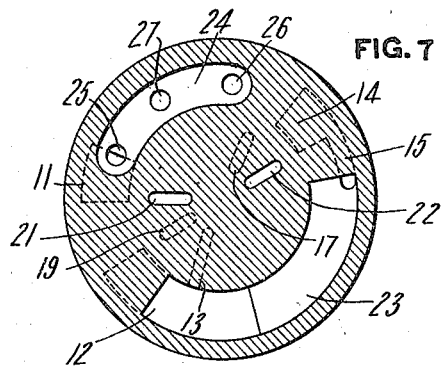
FIG. 7
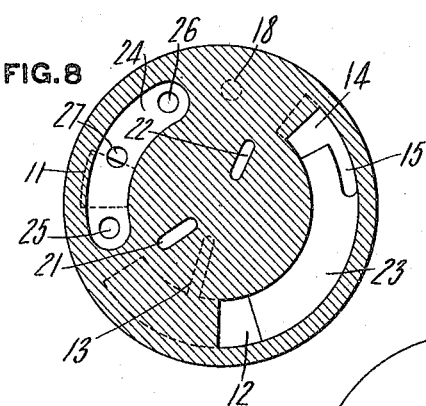
FIG. 8
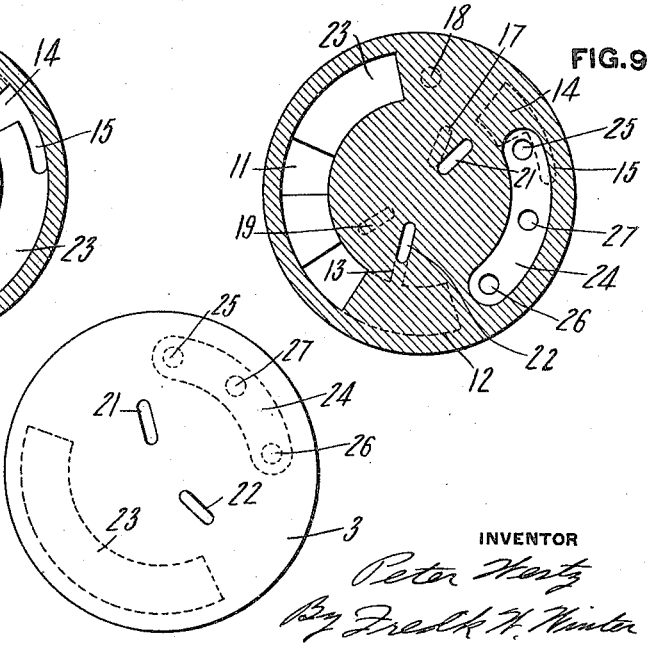
FIG. 9
FIG. 3
WITNESSES
INVENTOR
Peter Wertz
By Fredk H. Winter
Attorney

UNITED STATES PATENT OFFICE.

PETER WERTZ, OF PITTSBURGH, PENNSYLVANIA, ASSIGNOR TO SIMPLEX AIR-BRAKE COMPANY, OF PITTSBURGH, PENNSYLVANIA, A CORPORATION OF DELAWARE.

ENGINEER'S BRAKE-VALVE.

1,160,800.          Specification of Letters Patent.          Patented Nov. 16, 1915.

Application filed February 18, 1914. Serial No. 819,529.

*To all whom it may concern:*

Be it known that I, PETER WERTZ, a resident of Pittsburgh, in the county of Allegheny and State of Pennsylvania, have invented a new and useful Improvement in Engineers' Brake-Valves, of which the following is a specification.

This invention relates to engineers' brake valves for air brake systems. Its object is to provide a simple and efficient valve whereby the brakes can be applied and released for service and emergency applications in the usual way and which also provides for applying and releasing the engine brakes independently of the train brakes.

The invention comprises the construction and arrangement of parts hereinafter described and claimed.

Figure 1:
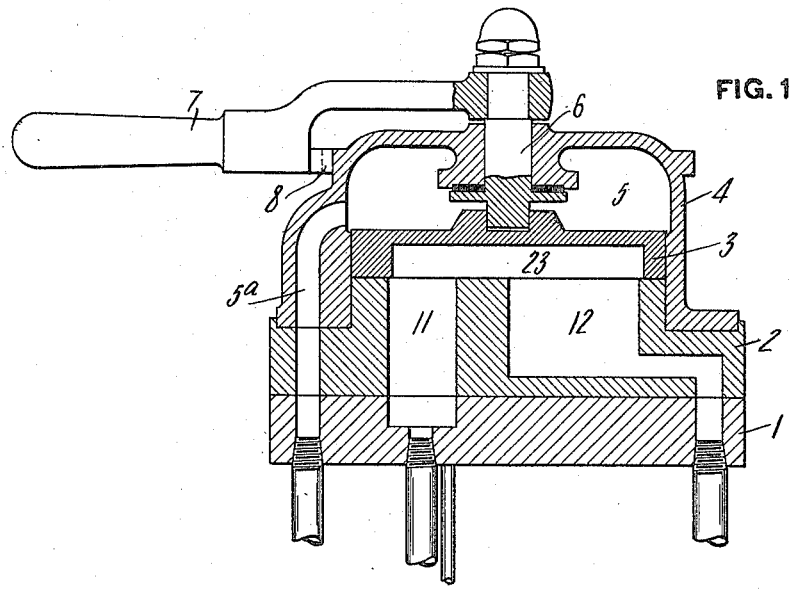
Figure 2:
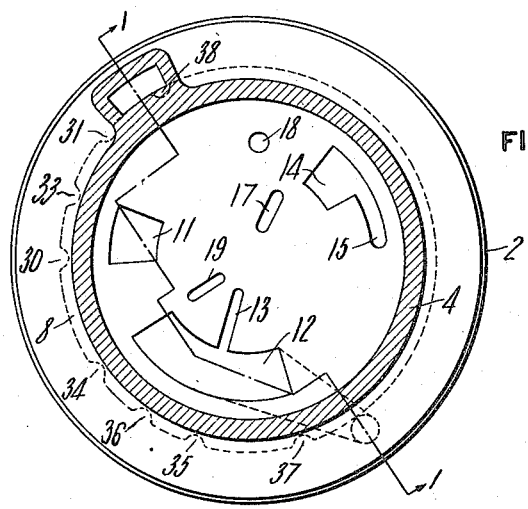

In the accompanying drawings Figure 1 is a vertical section through the brake valve, taken on the line 1—1, Fig. 2; Fig. 2 is a plan view of the valve seat and quadrant illustrating the different positions of the operating handle; Fig. 3 is a plan view of the rotary disk valve; and Figs. 4, 5, 6, 7, 8 and 9 are diagrammatic plan views of the valve and valve seat, illustrating the different positions of the valve.

The valve embodying the present invention is constructed upon the conventional lines of the rotary type of engineers' brake valves, the same comprising a suitable casing comprising a base member 1 provided with suitable openings to which are connected the various pipes leading to the different elements of the braking system, and upon which base member is secured the valve seat member 2 whose upper face forms the seat for the rotary disk valve 3, said seat and rotary disk being provided with ports and cavities hereinafter described for effecting the various operations. The valve 3 is inclosed by the cap member 4 so as to provide a chamber 5 above the rotary disk, which chamber is in direct communication with the main reservoir supply through passage 5ₐ which is external of the valve seat. The rotary valve is actuated by the usual stem 6 extending up through the cap member 4 and to which is attached an operating handle 7 which may be of usual construction and which has a spring dog coöperating with the notched segment 8, all as is common in engineers' brake valves and will be understood without further description. The mechanical construction of these parts may be varied within considerable limits without departing from the invention herein claimed.

The valve seat 2 is provided with the ports shown in Fig. 2 as follows: a relatively large port 11 located near the periphery of the valve and which will be connected to the main reservoir supply by way of the feed or reducing valve ordinarily employed; a large, crescent-shaped port 12 also located near the periphery of the seat and adjacent to the main reservoir port 11, and which port 12 is connected to the train pipe in the usual way. This port 12 is also supplied with a radial inward extension 13; a large exhaust port 14 on the opposite side of the valve seat and also located near the periphery of said seat; a smaller preliminary exhaust port 15 shown as an extension of the large exhaust port 14; an oblong radially arranged port 17 located near the center of the valve seat and the ports heretofore described and which is connected to the engine and tender brake cylinders, preferably by way of a pressure reducing valve; a small circular port 18 located substantially radially outwardly from the brake cylinder port 17 and also connected to the engine and tender brake cylinders by way of the pressure reducing valve; and a radially arranged oblong port 19 located adjacent to the train pipe port 12 but nearer the center of the valve seat and communicating directly with the brake cylinders.

The rotary disk valve is provided with the ports and cavities shown in Fig. 3, to-wit, a pair of radially arranged oblong ports 21 and 22 extending entirely through the valve and located relatively near the center of said valve and on opposite sides of its center; a large segmental cavity 23 extending approximately 135 degrees around the periphery of said valve; and a segmental cored-out passage 24 located diametrically opposite the cavity 23 and having three openings to the lower face of said disk valve, to-wit, end openings 25 and 26 and a central opening 27.

The rotary disk valve, it will be observed, is held to its seat by air pressure on its upper face in the chamber 5 in the usual way, and can be rotated by the handle 7 to bring it into the various positions illustrated in Figs. 4, 5, 6, 7, 8 and 9.

This valve has eight positions, six of which are as follows:

1. Running position, shown in Fig. 4, in which the spring dog of the operating handle engages shoulder 30 of the quadrant 8. In this position main reservoir port 11 is connected to train pipe port 12 through the cavity 23 in the valve, thereby maintaining train pipe pressure and holding the train brakes released. Port 25 also communicates with brake cylinder port 18 while port 27 communicates with exhaust port 14 and as ports 25 and 27 are connected through the cored-out passage 24 the engine and tender brake cylinders are released. All other ports are blanked. This is the position during normal running.

2. Straight air or engine application position, shown in Fig. 5. This position is assumed by rotation of the valve clockwise from running position until the spring dog of the operating handle engages shoulder 31 of the quadrant 8, when it is desired to apply the engine and tender brakes without applying the train brakes. In this position main reservoir port 11 is still connected to train pipe port 12 through the cavity 23, thus maintaining the engine brakes and keeping the train brakes released. The connection between brake cylinder port 18 and exhaust port 14 is broken, while the port 21 in the rotary valve registers with brake cylinder port 17, as a consequence of which the engine and tender brakes are supplied with air flowing from the chamber 5 above the rotary valve through ports 21 and 17 to the brake cylinder. The extent of braking pressure in this position is determined by the length of time the valve is allowed to remain in this position, but not to exceed 45 lbs., the pressure on the brake cylinder side of the pressure reducing valve. When the desired pressure in the engine and tender brake cylinders is secured the valve is rotated slightly counterclockwise to a position midway between positions numbers 1 and 2 in which the connection between ports 21 and 17 is broken, but without breaking the connection between main reservoir port 11 and train pipe port 12. This intermediate position is known as straight air lap position, and is not illustrated in the drawings, but is the position in which the spring dog of the operating handle engages notch 33 on the quadrant 8.

3. Independent release position, shown in Fig. 6. This position is secured by rotating the valve counter-clockwise from the straight air position just described, or counter-clockwise from the service position which will be hereinafter described, or until the spring dog on the operating handle engages notch 34 in the quadrant 8. In this position port 27 in the rotary valve registers with brake cylinder port 18, while port 26 registers with exhaust port 14, and as ports 26 and 27 are connected by the cored-out passage 24 the engine and tender brake cylinders are released. All other ports are blanked in this position of the valve, including the connection between main reservoir port 11 and train pipe port 12, and consequently in this position the engine and tender brake cylinders can be released not only after straight air application, as per position 2 above, but also after a service application position, and in the latter case the engine and tender brakes will be released without simultaneously releasing the train brakes, due to the fact that the connection between the main reservoir and train pipe is broken. This position serves, therefore, to release the engine and tender brakes without affecting the condition of the train brakes.

4. Service position, shown in Fig. 7. This position is secured by rotating the valve still farther counter-clockwise, or until the dog in the operating handle engages notch 35 in the quadrant 8. In this position the cavity 23 in the rotary valve connects train pipe port 12 with the small exhaust port or extension 15, thereby securing a slow venting of the train pipe to the atmosphere and applying the train brakes in the usual way. At the same time port 25 in the rotary valve overlaps main reservoir port 11 and port 26 with port 18 in the valve seat, thereby slowly admitting air to the engine and tender brake cylinders. Consequently in this position engine and tender brakes and train brakes are simultaneously applied. The amount of braking power secured depends upon the length of time the valve is allowed to remain in this position. When the desired braking power is secured the valve is moved backwardly somewhat, that is counter-clockwise, to a position intermediate positions 3 and 4, or to what is known as service lap position, in which the spring dog on the operating handle engages the notch 36 in the quadrant 8 and in which all ports are blanked. To increase the service braking pressure the valve can again be moved to service position, and back again to lap, until the desired braking pressure is secured. In this way the brakes can be graduated on as desired.

5. Emergency position, shown in Fig. 8. In this position the valve is rotated still farther counter-clockwise from service position until the spring dog of the operating handle engages notch 37 in the quadrant 8. In this position the cavity 23 in the rotary connects train pipe port 12 with both the large exhaust port 14 and its extension 15, thereby securing a quick venting of the train pipe and applying the train brakes in emergency application in the ordinary way. At the same time the port 22 in the rotary registers with brake cylinder port 17 in the valve seat, thereby applying the engine and tender brakes by a straight air application by way of the pressure reducing valve. It will be observed that the port 21 registers with brake cylinder port 19 so that there is an additional supply of main reservoir pressure unreduced to the engine brake cylinders. The consequence is that the engine brakes are applied fully as an emergency application.

6. Full release position, shown in Fig. 9. In this position the valve has been rotated to its limit clockwise, or until the spring dog on the operating handle engages notch 38 in the quadrant 8. In this position the cavity 23 in the rotary connects main reservoir port 11 with train pipe port 12, and simultaneously the port 22 in the rotary registers with extension 13 of the train pipe port. Consequently, the train pipe receives air from two passengers from the main reservoir which will secure a quick release of the brakes. All other ports are blanked. As a consequence the train brakes are released, but without releasing the engine brakes, so that this position can be used for the release of the train brakes independently of the engine brakes.

When both train and engine brakes are to be released the valve will be moved to the first position described or to running position.

The valve described has eight positions altogether, namely, the six positions illustrated in Figs. 4, 5, 6, 7, 8 and 9, and in addition two lap positions, to-wit, a straight air lap position between positions 1 and 2 and a service lap position between positions 3 and 4, which two positions are not illustrated in the drawings.

The valve described is of very simple construction, being of the type of an ordinary rotary valve, and all of the different positions are secured through the operation of a single handle, thereby avoiding any confusion in the operation of the brakes. By means of this valve the engine and tender brakes can be applied and released alone, or both engine and train brakes can be simultaneously applied, and the train brakes can be released independently of the engine brakes, although they cannot be applied independently of the engine brakes.

What I claim is:

1. In an engineer's brake valve, a valve seat provided with ports connecting with a reservoir, the train pipe, the atmosphere, and a brake cylinder, and a rotary valve coöperating with said valve seat and provided with ports and passages arranged in one position to connect the reservoir to the train pipe and the brake cylinder to the atmosphere, in another position to connect the reservoir to the train pipe and also to the brake cylinder, in a third position to connect the brake cylinder to the atmosphere and break the connection between the reservoir and train pipe, and in the fourth position to connect the train pipe to the atmosphere through a restricted opening and the reservoir to the brake cylinder.

2. In an engineer's brake valve, a valve seat provided with ports connecting with a reservoir, the train pipe, the atmosphere, and a brake cylinder, and a rotary valve coöperating with said valve seat and provided with ports and passages arranged in one position to connect the reservoir to the train pipe and the brake cylinder to the atmosphere, in another position to connect the reservoir to the train pipe and also to the brake cylinder, in a third position to connect the brake cylinder to the atmosphere and break the connection between the reservoir and train pipe, in a fourth position to connect the train pipe to the atmosphere through a restricted opening and the reservoir to the brake cylinder, and in a fifth position to connect the reservoir to the train pipe and blank the connection between the brake cylinder and atmosphere.

3. In an engineer's brake valve, a valve seat provided with ports connecting with a reservoir, the train pipe, the atmosphere, and a brake cylinder, and a rotary valve coöperating with said valve seat and provided with ports and passages arranged in one position to connect the reservoir to the train pipe and the brake cylinder to the atmosphere, in another position to connect the reservoir to the train pipe and also to the brake cylinder, in a third position to connect the brake cylinder to the atmosphere and break the connection between the reservoir and train pipe, in a fourth position to connect the train pipe to the atmosphere through a restricted opening and the reservoir to the brake cylinder, in a fifth position to connect the reservoir to the train pipe and blank the connection between the brake cylinder and the atmosphere, and in a sixth position to connect the train pipe to the atmosphere through an unrestricted opening and the reservoir to the brake cylinder.

4. In an engineer's brake valve the combination of a valve seat provided with ports connecting with a reservoir, the train pipe, the atmosphere, and a brake cylinder, and a rotary valve coöperating with said valve seat and provided with ports and passages arranged in one position to connect the reservoir to the train pipe and the brake cylinder to the atmosphere, in another position to connect the reservoir to the train pipe and also to the brake cylinder, in a third position to connect the brake cylinder to the atmosphere and break the connection between the reservoir and train pipe, in a fourth position to connect the train pipe to the atmosphere through a restricted opening and the reservoir to the brake cylinder, and in a fifth position to connect the train pipe to the atmosphere through an unrestricted opening and the reservoir to the brake cylinder.

5. In an engineer's brake valve the combination of a valve seat provided with ports connecting with a reservoir, the train pipe, the atmosphere, and a brake cylinder, and a rotary valve coöperating with said valve seat and provided with ports and passages arranged in service position to connect the train pipe to the atmosphere through a restricted opening and the reservoir to the brake cylinder, in emergency position to connect the train pipe to the atmosphere through an unrestricted opening and the reservoir directly to the brake cylinder, and also having a port arranged to connect the reservoir to the brake cylinder by way of a reducing valve.

6. In an engineer's brake valve the combination of a valve seat provided with ports connecting with a reservoir, the train pipe, the atmosphere, and a brake cylinder, and a rotary valve coöperating with said valve seat and provided with a cavity arranged in one position to connect the reservoir to the train pipe and in another position to break said connection, and having a cored-out passage provided with three ports to the face of the valve and so arranged that in one of said positions two of said ports register respectively with the brake cylinder port and the exhaust port and in the other of said positions the third named port and one of the first named ports register respectively with the exhaust port and the brake cylinder port.

7. In an engineer's brake valve the combination of a valve seat provided with ports connecting with a reservoir, the train pipe, the atmosphere, and a brake cylinder, and a rotary valve coöperating with said valve seat and provided with a cavity arranged in one position to connect the reservoir to the train pipe and in service and emergency positions to connect the train pipe to the atmosphere and having a port arranged in emergency position to connect the reservoir directly to the brake cylinder through one port in the valve seat and arranged to also connect the reservoir to the brake cylinder through another port by way of a reducing valve.

8. In an engineer's brake valve the combination of a valve seat provided with ports connecting with a reservoir, the train pipe, the atmosphere, and a brake cylinder, and a rotary valve coöperating with said valve seat and provided with a cavity arranged in service and emergency positions to connect the train pipe to the atmosphere, and in running, release and straight air positions to connect the reservoir to the train pipe, said valve also having a pair of ports one of which in release position connects the reservoir to the train pipe and the other of which in application position connects the reservoir to the brake cylinder, and both of which ports in emergency position connect the reservoir to the brake cylinder.

In testimony whereof, I have hereunto set my hand.

PETER WERTZ.

Witnesses:
 ELBERT L. HYDE,
 WILLIAM B. WHARTON.

Copies of this patent may be obtained for five cents each, by addressing the "Commissioner of Patents, Washington, D. C."